United States Patent
Jimenez

(10) Patent No.: US 10,776,075 B1
(45) Date of Patent: Sep. 15, 2020

(54) STOVETOP OVEN HAVING AN AUDIO SYSTEM

(71) Applicant: Miguel Jimenez, Alta Loma, CA (US)

(72) Inventor: Miguel Jimenez, Alta Loma, CA (US)

(*) Notice: Subject to any disclaimer, the term of this patent is extended or adjusted under 35 U.S.C. 154(b) by 0 days.

(21) Appl. No.: 16/597,987

(22) Filed: Oct. 10, 2019

(51) Int. Cl.
| | |
|---|---|
| *G06F 3/16* | (2006.01) |
| *H04R 1/02* | (2006.01) |
| *H04R 3/00* | (2006.01) |
| *G06F 3/14* | (2006.01) |
| *H04B 1/08* | (2006.01) |
| *H04H 60/82* | (2008.01) |
| *H04H 20/74* | (2008.01) |
| *H04W 4/80* | (2018.01) |
| *F24C 7/08* | (2006.01) |
| *H04H 40/90* | (2008.01) |

(52) U.S. Cl.
CPC .............. *G06F 3/165* (2013.01); *F24C 7/082* (2013.01); *G06F 3/14* (2013.01); *H04B 1/08* (2013.01); *H04H 20/74* (2013.01); *H04H 40/90* (2013.01); *H04H 60/82* (2013.01); *H04R 1/028* (2013.01); *H04R 3/00* (2013.01); *H04W 4/80* (2018.02); *H04R 2499/10* (2013.01)

(58) Field of Classification Search
CPC .. G06F 3/165; G06F 3/14; H04W 4/80; F24C 7/082; H04B 1/08; H04H 20/74; H04H 40/90; H04H 60/82; H04R 1/028; H04R 3/00; H04R 3499/10
See application file for complete search history.

(56) References Cited

U.S. PATENT DOCUMENTS

| | | | |
|---|---|---|---|
| 7,476,828 B2 | 1/2009 | Genua | |
| 9,930,469 B2 * | 3/2018 | De Poortere | ........... H04S 7/302 |
| 10,609,481 B2 * | 3/2020 | Singer | .................... H04R 3/007 |

FOREIGN PATENT DOCUMENTS

DE          10224364 A1 * 12/2003 ................ F24C 7/08

OTHER PUBLICATIONS

English translation of DE102243364 published (Dec. 2003).*

* cited by examiner

*Primary Examiner* — Andrew L Sniezek
(74) *Attorney, Agent, or Firm* — Sanchelima & Associates, P.A.; Christian Sanchelima; Jesus Sanchelima

(57) ABSTRACT

A stovetop oven having an audio system comprising of a stove assembly and an audio assembly is disclosed herein. The stove assembly includes a stovetop and an oven that is configured to aid a user in cooking food. The audio assembly comprises a display unit having a processor, speakers, and a radio. The display unit displays the current media being played by a user utilizing the stove. Additionally, a user may navigate and control the audio media being played using buttons configure to the display unit. The processor allows the unit to play audio media through various forms such as WIFI, Bluetooth, and satellite radio. The radio of the audio assembly receives radio signals allows the user to tune into various radio channels for their enjoyment. The stove top oven having an audio system creates an entertaining environment for a user in the kitchen.

12 Claims, 3 Drawing Sheets

STOVETOP OVEN HAVING AN AUDIO SYSTEM

BACKGROUND OF THE INVENTION

1. Field of the Invention

The present invention relates to a stovetop oven and, more particularly, to a stovetop oven having an audio system that allows a user to play audio media in their kitchen environment thereby creating a more comfortable environment for a user in the kitchen.

2. Description of the Related Art

Several designs for a stovetop oven having an audio system have been designed in the past. None of them, however, include an oven having an integral radio with speakers on the interface or control panel of the oven. It is known that individuals often use their kitchen every day to cook food. It is also known that an integral component in the cooking of food in a kitchen is the stove. Individuals often like to enjoy audio media when cooking in the kitchen. However, none of the usual appliances in the kitchen are configured to play audio media for a user. Therefore, there is a need for a stovetop oven having an integrated audio system to create a more comfortable environment for a user.

Applicant believes that a related reference corresponds to U.S. Pat. No. 7,476,828 issued for A media microwave oven for showing videos at a workplace. The media microwave oven includes: a microwave oven; a display screen embedded in the door of the microwave oven; a speaker; and a lockable compartment containing a computer system. However, it differs from the present invention because the U.S. Pat. No. 7,476,828 reference fails to provide an efficient method for providing a user to play audio media in a stovetop oven device. The reference additionally fails to provide a user with the efficiency and selective means to allow the user to play any form of audio media. The present invention addresses these issues by providing a stovetop oven having an audio assembly therein. The audio assembly allows a user to play various forms of audio media such as but not limited to WIFI, Bluetooth, radio and the like.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a stovetop oven having an audio system that provides a more comfortable kitchen environment for a user by playing audio media for a user.

It is another object of this invention to provide a stovetop oven having an audio system that provides allows a user to cook food on the oven while simultaneously listening to audio media.

It is still another object of the present invention to provide a stovetop oven having an audio system that allows a user to connect a mobile device to the audio system to allow a user to stream desired audio media to the audio system.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
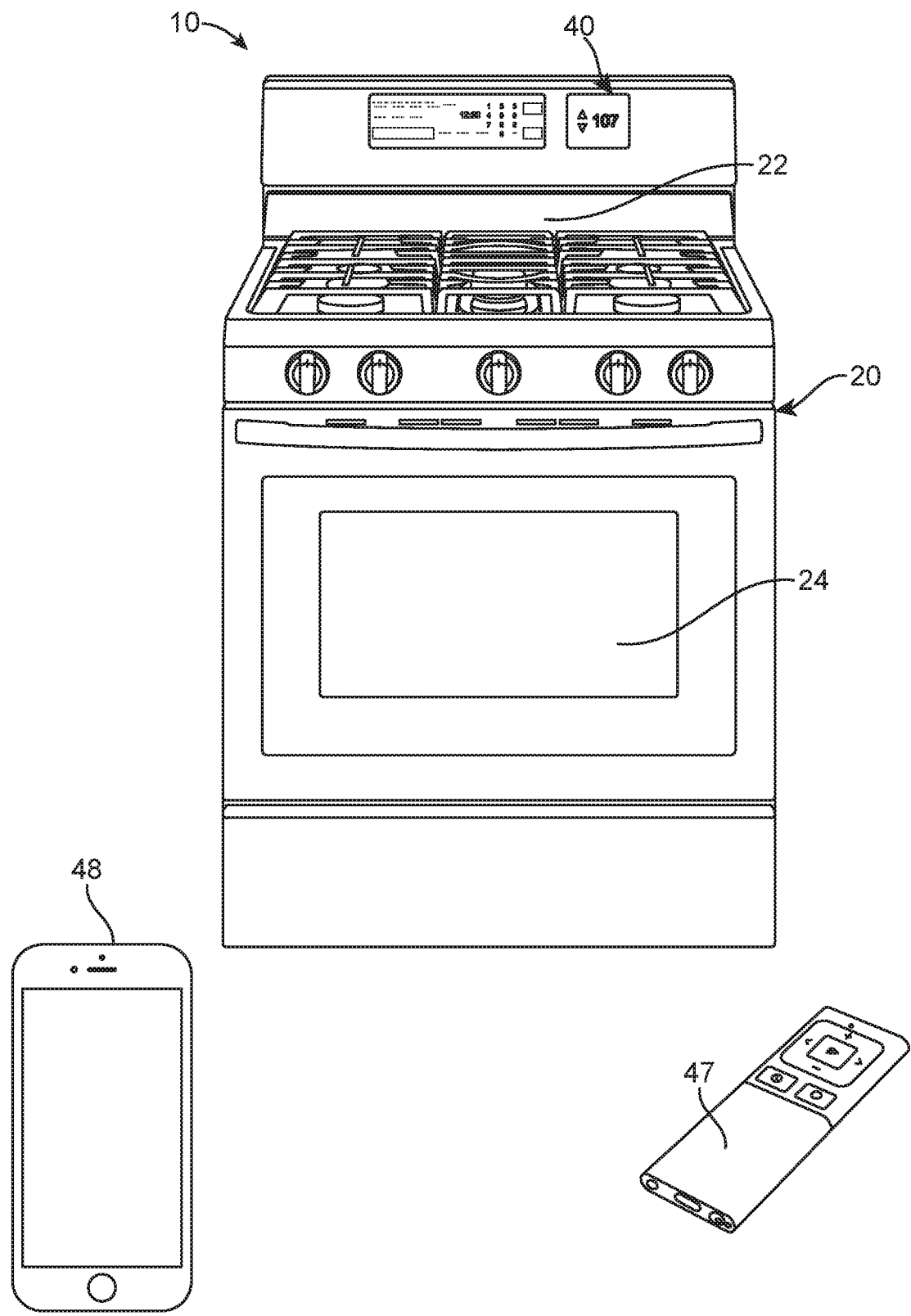
FIG. 1 represents a front view of a stovetop oven having an audio system 10 wherein stove assembly 20 and audio assembly 40 may be observed in accordance to an embodiment of the present invention.
Figure 2:
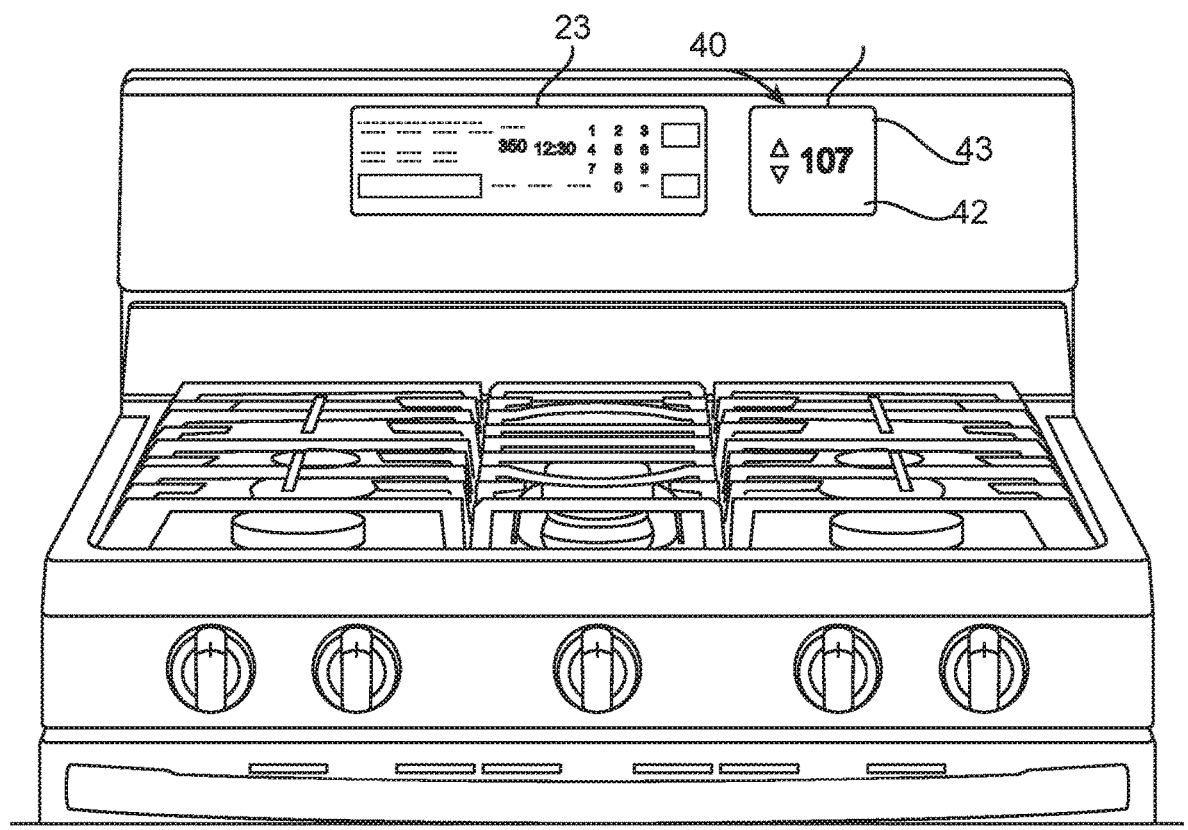
FIG. 2 shows an enlarged view of audio assembly 40 wherein display unit 42 may be observed in accordance to an embodiment of the present invention.
Figure 3:
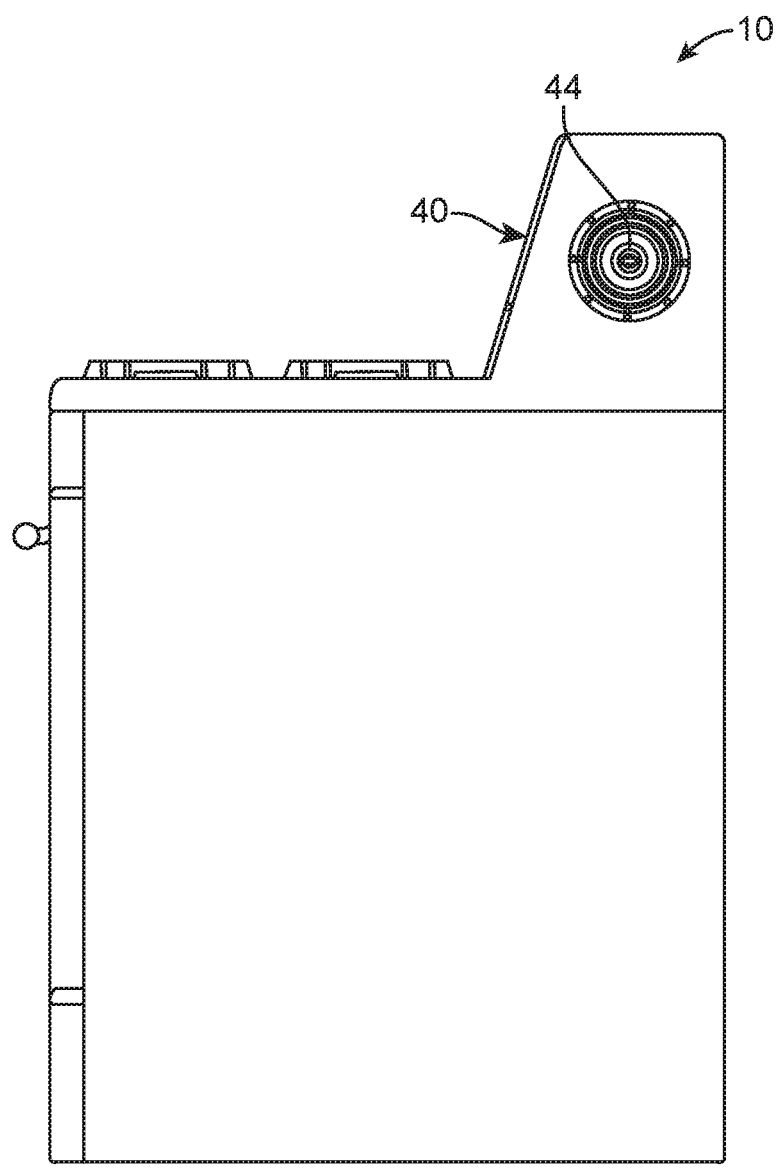
FIG. 3 illustrates a side view of stove assembly 20 wherein speakers 44 may be seen mounted thereon.

Referring now to the drawings, where the present invention is generally referred to with numeral 10, it can be observed a stovetop oven having an audio system 10 that basically includes a stove assembly 20 and an audio assembly 40.

Stove assembly 20 includes a stovetop 22 and an oven 24. Stovetop 22 may be a stovetop of prior art that is configured to heat and cook food for a user. Stovetop 22 as known includes heating areas in which a user may place a pot or a pan thereon to be heated thereby cooking the food stored in the pots or pans. Furthermore, as known, the heat level of stovetop 22 may be controlled by a user. Stove assembly 20 may also include a stove top display 23 to provide a user information of said stovetop. In the present embodiment stovetop 22 is to be installed in an individual's kitchen environment. However, it should be understood that any suitable stovetop of any shape may be used for a stovetop oven having an audio system 10. Oven 24 may be cubic in shape and configured to have stovetop 22 thereon. It should be understood that any design of any oven and stovetop may be used for an embodiment.

Audio assembly 40 includes a display unit 42 having a processor 43. Display unit 42 serves as a medium for a user to configure the audio media being played by audio assembly 40. In the present embodiment, display unit 42 displays to a user the title of the audio media being played for an individual in a kitchen environment. In one embodiment of the present invention, display unit 42 is of a touch screen variety, thereby allowing a user to operate audio assembly 40 using display unit 42. In another embodiment of the present invention, display unit 42 includes knobs allowing a user to configure and adjust the audio media of audio assembly 40. Furthermore, display unit 42 is disposed on stovetop 22. In one embodiment of the present invention, display unit 42 may be an existing display unit on a stovetop 22 configured to be modified to include audio assembly 40. In another embodiment of the present invention, display unit 42 is provided as an additional display unit disposed on stovetop 22 and configured to exclusively display and control audio media from audio assembly 20. The sound from audio assembly 40 comes out of speakers 44 disposed on stovetop 42. Speakers 44 may be of a circular nature or they may be of a sound bar nature. It should be understood that any form of speaker would be suitable to work with audio assembly 40. It should also be understood that speakers 44 may be disposed on any suitable location on stove assembly 20. Audio assembly 40 further includes a radio 46 configured to receive radio signal and allows the user to play audio media from different radio stations. Radio 46 is disposed on stovetop 22 in conjunction with display unit 42. Radio 46 may also include additional features such as satellite radio, allowing a user to tune into different radio stations from all over the world. Processor 43 allows a user to send and receive signals from audio assembly 40. Processor 43 further allows a user to connect a mobile device 48 to audio assembly 40. A user may connect to audio assembly 40 using known methods such as WIFI, Bluetooth, and the like. Physical connections such as an audio jack or a USB port may be used as well. Mobile device 48 may further be configured with a mobile app to allow users to configure the audio media being played form audio assembly 40 from their mobile device. Additionally, audio system 40 may cooperate with known smart home devices and programs such as "Siri", "Alexa", and "Echo." Furthermore, the audio media of audio assembly may be controlled through a remote control 47. Remote control 47 may include buttons that allow a user to configure things such as volume and radio stations of audio assembly 40. Remote control 47 may comprise of any suitable shape and may be lightweight so as to not strain an individual using remote control 47. A stovetop oven having an audio system 10 provides a user with a comfortable kitchen environment. The tuned radio station will be played when a temperature, set by a user, is provided to the stove assembly 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a stovetop oven having an audio system, comprising:
   a. a stove assembly, including a stovetop and an oven, said stovetop is disposed on the top of said oven, wherein said stove assembly includes a stovetop display mounted on said stovetop; and
   b. an audio assembly, including a display unit having a processor, wherein said display unit is disposed on said stovetop, said audio assembly further including a radio disposed therein to allow a user to tune into various radio stations, wherein a mobile device connects to said audio assembly and allows a user to stream audio media to said audio assembly, wherein the tuned radio station will be played based on a user controlled temperature provided to said stove assembly.

2. The system for a stovetop oven having an audio system of claim 1 wherein a user may control the sound from said audio assembly using a remote control.

3. The system for a stovetop oven having an audio system of claim 1 wherein the sound comes out of said audio assembly through speakers.

4. The system for a stovetop oven having an audio system of claim 3 wherein said speakers is disposed on sides of said stove top.

5. The system for a stovetop oven having an audio system of claim 1 wherein said display unit is disposed on the front end of said stovetop.

6. The system for a stovetop oven having an audio system of claim 1 wherein said display unit displays information of the audio media being played.

7. The system for a stovetop oven having an audio system of claim 1 wherein said mobile device connects to said audio assembly using WIFI or Bluetooth.

8. The system for a stovetop oven having an audio system of claim 1 wherein said display unit additionally provides information of the temperature of said stovetop and said oven to a user.

9. The system for a stovetop oven having an audio system of claim 1 wherein said radio allows a user to listen to satellite radio.

10. The system for a stovetop oven having an audio system of claim 1 wherein said certain radio stations will be played based on a temperature provided to said stove assembly.

11. The system for a stovetop oven having an audio system of claim 1 wherein said radio is integrated into said stovetop display.

12. A device for a stovetop oven having an audio system, comprising:
   a. a stove assembly, including a stovetop and an oven, said stovetop is disposed on the top of said oven; and
   b. an audio assembly, including a display unit having a processor, wherein said display unit is disposed on the front end of said stovetop, said display unit being rectangular in shape, said audio assembly further including a radio disposed therein to allow a user to tune into various radio stations, wherein a mobile device to connects to audio assembly and allows a user to stream audio media to said audio assembly, where the sound of said audio system is controlled using a remote control, wherein said sound of said audio assembly comes out of speakers disposed on the front end of said stovetop, wherein the tuned radio station will be played based on a user controlled temperature provided to said stove assembly.

\* \* \* \* \*